Oct. 22, 1940.  H. J. KENGEL  2,218,823

ASSEMBLY BOLT NUT CAGE

Filed May 4, 1938

INVENTOR
Herbert J. Kengel
BY Myron J. Diksman
ATTORNEY

Patented Oct. 22, 1940

2,218,823

UNITED STATES PATENT OFFICE 2,218,823

ASSEMBLY BOLT NUT CAGE

Herbert J. Kengel, Detroit, Mich.

Application May 4, 1938, Serial No. 205,922

3 Claims. (Cl. 85—32)

The object of my invention is to produce a demountable spring casing, or cage for bolt nuts, especially adapted for automobile body assembly sections, and other similar construction work.

Another object is to provide a detachable bolt nut cage that may be readily removed from any supporting panel slot without injury or distortion of the cage walls, or easily remounted therein.

A further object is to produce a detachable bolt nut cage that will form a dust proof joint with the supporting panel surface, when the bolt nut is mounted therein.

A still further object is to produce a detachable spring nut cage for assembly work, that is simple in construction, easily and efficiently installed, and that can be manufactured at a very low cost.

These several objects are attained in the preferred form by the construction and arrangement of parts more fully hereinafter set forth.

Similar parts on the drawing are marked by similar numerals or letters.

Figure 3:
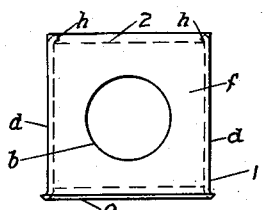
Fig. 3 is a top view of the cage showing the central bolt recess opening, and the relative position of the various operating parts.
Figure 2:
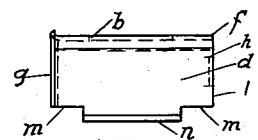
Fig. 2 is a side view of the nut cage showing the relative position of the attaching means formed thereon.
Figure 1:
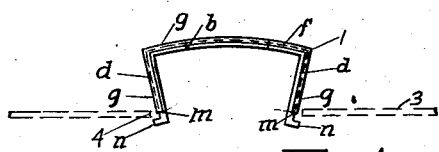
Fig. 1 is an elevation of the open cage end, with the nut removed, showing the curved central wall section, designed to retract the attaching lugs, when unrestrained.

In automobile body assembling work, the sheet metal panels stamped and pressed into form, are united with other parts or sections, bolted together. Due to special construction of the thin body walls, much difficulty has been experienced in placing and retaining assembly bolt nuts in position, while attaching parts and entering the bolt therein, and it has been found advantageous to provide special nut cages for fixedly mounting the nuts on the panel walls, before the parts are assembled.

It is known that various types of bolt nut cages are now in use for this purpose, but not of the construction and application herein disclosed, or possess the special mounting or detachable features herein disclosed.

In general my device comprises a semi-rectangular band cage, open at both ends, designed to fit over the top and opposite side walls of the assembly nut. The band ends are provided with suitable engaging means for fixedly attaching the cage to a suitable panel recess. The assembly bolt may readily be passed through the nut and supporting cage when properly mounted on the panel.

I will now describe more fully the detail construction of my device, referring to the drawing and the marks thereon.

Figure 4:
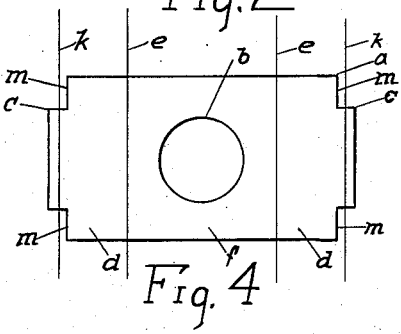
Fig. 4 illustrates a stamping of thin sheet metal from which the special nut cage is formed, and with the bend lines indicated thereon.
Figure 6:
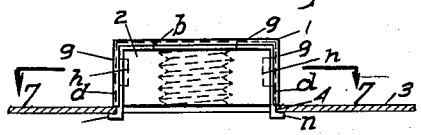
Fig. 6 is an elevation of the open cage showing a nut mounted therein, within an assembly panel recess.
Figure 5:
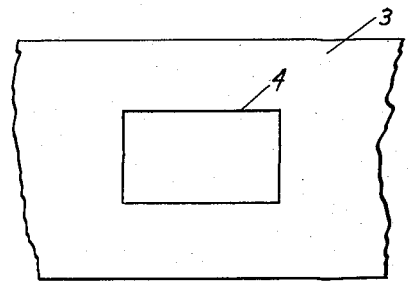
Fig. 5 illustrates a sheet metal body assembly panel with a cage recess opening formed therein, within which my special nut cage may be mounted.
Figure 7:
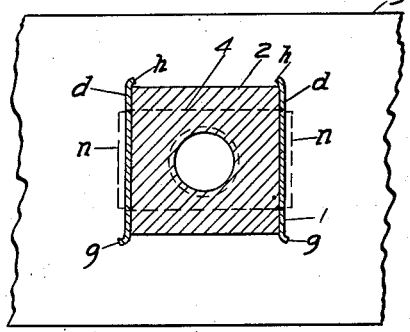
Fig. 7 is a cross-sectional view through the assembled cage and nut, taken on the line 7—7 of Fig. 6, showing the relative position of the attaching lugs when expanded within the panel recess.

The preferred type of cage 1 is shown in the Figs. 1 to 7 of the drawing, and is preferably formed of a narrow rectangular stamping of thin spring sheet metal a, as illustrated in the Fig. 4. The stamping a is designed with a centrally positioned bolt recess b formed therein, and with restricted lug projections c at opposite ends thereof. The end sections d of the stamping a are bent along parallel lines e to approximately right angles to the central section f, forming an inclosing band cage 1 designed to fit over the top and opposite side walls of an assembly bolt nut 2, as may be mounted therein. The central section f is slightly curved outwardly, and which thereby inclines the opposite end sections d inwardly toward each other, when unrestrained, and provides an open space between the ends d slightly shorter than the width of the nut 2 to be mounted therein. One end of the cage 1 is formed with a bell-shaped edge g, expanding sufficiently to allow the bolt nut 2 to engage therewith in its contracted position, and to expand same as the nut is forced therein. The opposite cage end is provided with small stop projections h pressed in the ends d, and are designed to prevent the nut 2 from passing through the cage when pressed therein. The flange and stops may also be duplicated at both ends. The end lug projections c as indicated in Fig. 4, are each bent outwardly along parallel lines k, positioned a distance from the inner lug shoulder m equal to the thickness of the assembly panel metal 3, and at approximately at right angles to the cage ends d, forming attaching means n at opposite cage ends. When the cage 1 is unrestrained, the curvature of the central spring section f is designed to contract the end attaching lugs n sufficiently to allow them to pass through a panel recess 4 as formed in an assembly panel 3, as illustrated in Fig. 3, and connects therewith as the lug shoulders m rest on the panel surface. Any suitable bolt nut 2 may then be pressed edgewise within the bell-shaped cage end g and forced within the cage 1 until centrally positioned therein, and until said nut engages the end stops h. The forcing of the nut 2 within the cage 1, expands same sufficiently to force the attaching lugs n over the edges of the panel recess 4 and rigidly clamping the cage thereto. The nut 2 forms a dust proof joint with the panel slot opening 4 when said cage and nut are properly assembled. The cage 1 is easily removed from the panel recess 4 by first displacing the nut 2 therefrom and which will allow the casing to contract slightly due to the curved spring central section f, and sufficiently for removing the cage from the panel recess opening. Any cage may be readily removed or remounted at will and without any injury or deformation of the cage walls. The central bolt recess b provides ample passage for the assembly bolt to be readily passed through both nut and cage. Soft, or non-spring metal may also be used where desirable.

Figure 9:
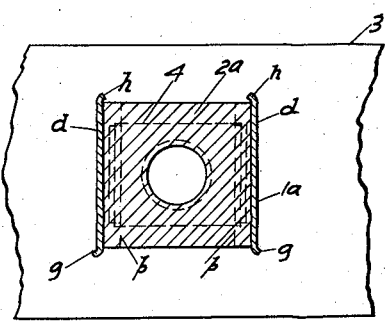
Fig. 9 is a cross-sectional view through the modified cage and nut, taken on the line 9—9 of the Fig. 8, showing the arrangement of the special attaching lugs.
Figure 8:
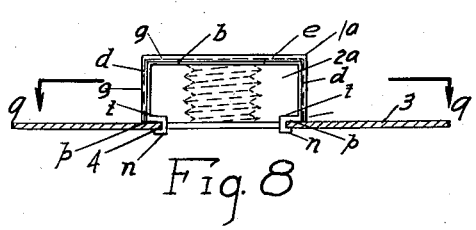
Fig. 8 is an elevation of a modified form of cage and nut, assembled within a panel recess, showing special receding panel attaching means as formed thereon.

A modified form of cage 1a is illustrated in the Figs. 8 and 9 of the drawing, and is designed with a short inwardly inclined lower ledge wall p formed thereon, providing a flat finished surface for engaging the assembly panel 3 instead of the rough plate edge previously shown. The bolt nut 2a must likewise be formed with edge grooves t along the lower edges thereof to allow full surface contact with the supporting assembly panel 3 and for forming a dust proof joint therewith. The remaining construction and operation is exactly the same as previously described. This modified cage 1a has a more rigid construction and finished appearance than the prior design, although it is more expensive and difficult to manufacture. Either cage may be formed as a double unit for bolts set close together.

Having fully described my assembly bolt nut cage, what I claim as my invention and desire to secure by Letters Patent is:

1. A sheet metal cage adapted for attaching a bolt nut to an assembly panel recess opening and used in combination therewith, comprising a thin strip of suitable sheet metal bent and formed to fit over the top and opposite side walls of a bolt nut having parallel sides, the central top section being curved outwardly and provided with a bolt recess therethrough, one cage end being formed with a bell-shaped end and with the opposite cage end providing with suitable nut stops pressed therein, and suitable attaching lugs provided on the extended ends of the cage side walls for engaging the edges of an assembly panel recess opening.

2. A spring sheet metal cage adapted for attaching a bolt nut to an assembly panel recess opening and used in combination therewith, comprising a thin strip of thin spring sheet metal bent and formed to fit over the top and opposite side walls of a bolt nut having parallel sides, said central cage section being curved outwardly and provided with a bolt recess therethrough, one of said cage ends being formed bell-shaped for receiving a nut therein and the opposite cage end provided with suitable nut stops, L-shaped attaching lugs formed on the extended ends of the opposite cage side walls, designed to engage the edges of an assembly panel recess opening, and a suitable bolt nut of the type stated for pressing within said cage for expanding same when said cage is mounted within the panel recess opening.

3. A sheet metal cage adapted for attaching a bolt nut to an assembly panel recess opening and used in combination therewith, comprising a rectangular shaped band formed of suitable thin sheet metal bent to fit over the top and opposite side walls of a bolt nut having parallel sides, and with ends bent beneath forming bottom ribs along each side thereof, the cage side sections being bent at approximately right angles to the central section, a restricted lug formed on the inner edge of each bottom rib designed to engage the edge of a panel recess opening, one end of the cage ends being formed bell-shaped for receiving the said nut therein, and the opposite cage end provided with suitable nut stops formed thereon, the said central cage section also being provided with a bolt recess formed therethrough, and a bolt nut formed with suitable grooved edges designed to be pressed within said cage and expand same after same has been mounted within the panel recess and for rigidly attaching same thereto.

HERBERT J. KENGEL.